UNITED STATES PATENT OFFICE.

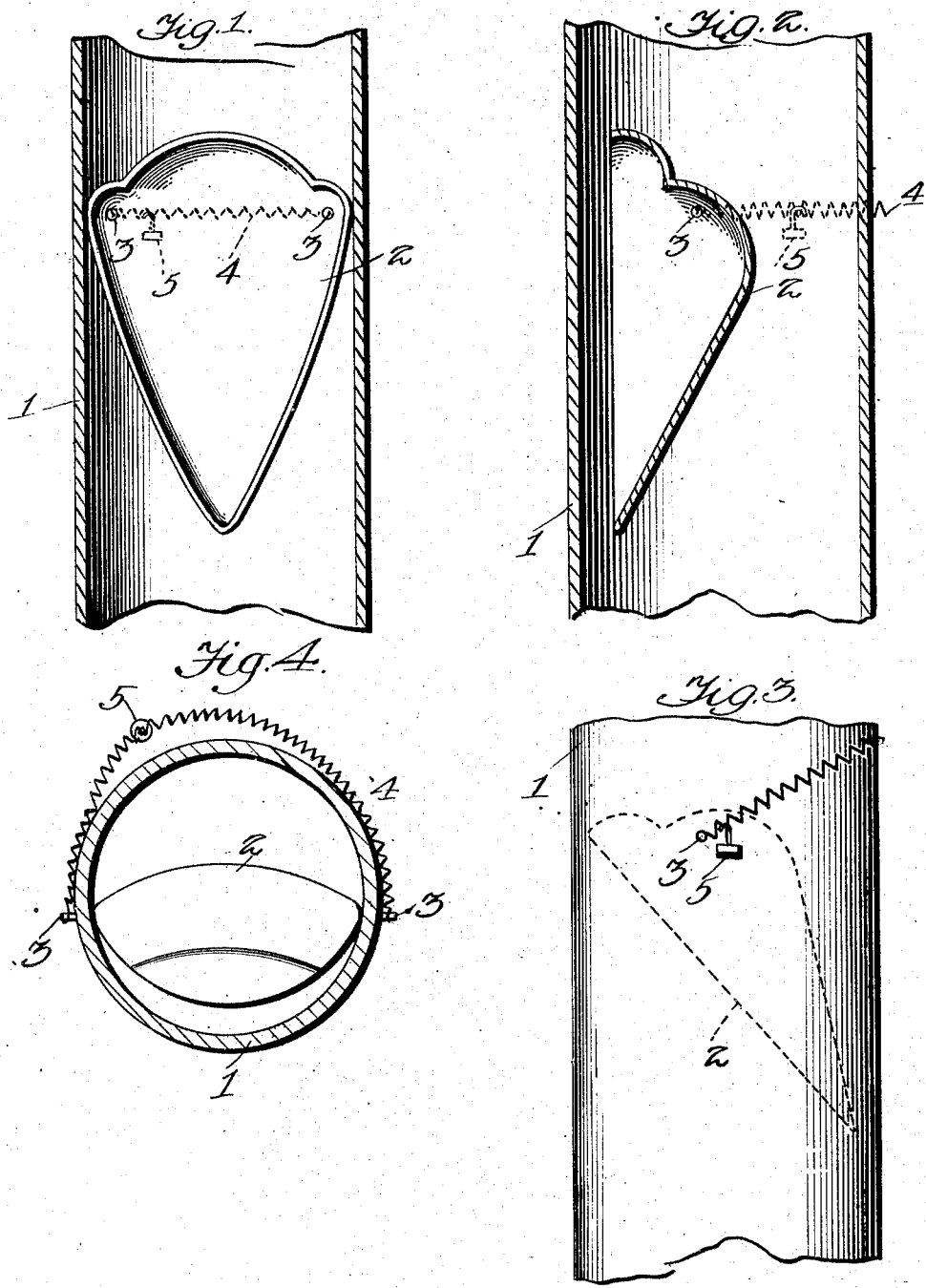

JOSEPH HUTCHINSON AND CLIFFORD C. HAMILTON, OF GULL LAKE, SASKATCHEWAN, CANADA.

DAMPER FOR STOVEPIPES.

1,308,492.        Specification of Letters Patent.        Patented July 1, 1919.

Application filed February 8, 1919. Serial No. 275,865.

*To all whom it may concern:*

Be it known that we, JOSEPH HUTCHINSON and CLIFFORD C. HAMILTON, subjects of the King of Great Britain, and residents of Gull Lake, in the Province of Saskatchewan and Dominion of Canada, have invented certain new and useful Improvements in Dampers for Stovepipes, of which the following is a specification.

Our invention is an improvement in dampers for stove pipes, and has for its object to provide a damper of the character specified which will vary the capacity of the pipe in accordance with the draft through the pipe, and which is automatically controlled by the draft.

In the drawings:

Figure 1 is a vertical section of the pipe with the damper in elevation;

Fig. 2 is a section at right angles to Fig. 1;

Fig. 3 is a side elevation of the pipe;

Fig. 4 is a horizontal section looking down upon the damper.

The present embodiment of the invention is shown in connection with a section 1 of stove pipe of usual construction. The damper comprises a sheet 2 of suitable sheet metal, substantially heart shaped in contour, and so arranged that when in inclined position across the opening through the stove pipe it will close or partially close the opening through the pipe. This damper is concavo-convex as shown, and is suspended in the pipe in such manner that when the damper is closed the concave surface of the damper will be downward.

The damper is supported by journal pins 3 which extend laterally from the widest dimension thereof at opposite points of the said dimension, and the said journal pins are journaled in the pipe, as shown. The point of journaling is at one side of the center, that is, not in a diametric line, as more particularly shown in Fig. 4. It will be obvious that when the pointed end or apex of the damper swings toward the right of Fig. 2 the damper will close or partially close the bore of the pipe.

The damper is counterbalanced to normally hang in the position of Fig. 2. For this purpose a semi-circular length of wire 4 is connected at its ends to the journal pins where they extend beyond the pipe. This wire is continuous from one pin to the other, passing around the pipe as shown, and the said wire is corrugated or bent in zigzag form from one end to the other. These corrugations or zigzags provide means for engagement of the counterweight to hold the same in adjusted position.

A counterweight 5, is adapted to be hooked upon the wire at a suitable point to properly counterbalance the damper to hold the same open at a certain pressure of air in the pipe. It will be noticed that the wire 4 loosely embraces the pipe, so that it does not interfere with the swinging of the damper, and the counterweight may be placed wherever desired.

In use, the amount of draft desired through the pipe being ascertained, the counterweight is arranged accordingly. Under normal conditions the damper will occupy about the position of Fig. 2, interfering in no way with the draft through the pipe. Should, for instance, there be an increase in the draft, the damper will automatically close or partially close to check the draft, moving just far enough for the purpose.

The heart or shield shape of the damper and its concave form permit the draft to continue in the same direction, while being gradually checked, and for this reason is more effective than a flat circular disk since at no time, even when fully checked, will the smoke and gas pour out of the stove door. The checking is very gradual and the increased draft will be gradually checked and not sharply as with the plain disk.

We claim:

The combination with a draft pipe, of a damper arranged therein and adapted to be controlled by the draft, the said damper having journal pins engaging the pipe and extending through the same, a corrugated wire having its ends secured to the journal pins and partially embracing the pipe and spaced apart therefrom to swing freely with respect thereto, and a counterweight adjustable on the wire.

JOSEPH HUTCHINSON.
CLIFFORD C. HAMILTON.

Witnesses:
CHARLES MYTTON,
J. B. WILKS.

Copies of this patent may be obtained for five cents each, by addressing the "Commissioner of Patents, Washington, D. C."